(12) United States Patent
Storl et al.

(10) Patent No.: US 11,068,486 B2
(45) Date of Patent: Jul. 20, 2021

(54) METHOD FOR AUTOMATICALLY PROCESSING A NUMBER OF LOG FILES OF AN AUTOMATION SYSTEM

(71) Applicant: SIEMENS AKTIENGESELLSCHAFT, Munich (DE)

(72) Inventors: Alexander Storl, Hetzles (DE); Steffen Pauer, Weissenburg (DE); Mikhail Roshchin, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 883 days.

(21) Appl. No.: 15/301,640

(22) PCT Filed: Mar. 24, 2015

(86) PCT No.: PCT/EP2015/056227
§ 371 (c)(1),
(2) Date: Oct. 3, 2016

(87) PCT Pub. No.: WO2015/150163
PCT Pub. Date: Oct. 8, 2015

(65) Prior Publication Data
US 2017/0017693 A1 Jan. 19, 2017

(30) Foreign Application Priority Data
Apr. 4, 2014 (EP) ..................................... 14163510

(51) Int. Cl.
*G06F 16/2455* (2019.01)
*G06F 16/17* (2019.01)
(Continued)

(52) U.S. Cl.
CPC .......... *G06F 16/24561* (2019.01); *F02C 9/28* (2013.01); *G05B 19/41855* (2013.01);
(Continued)

(58) Field of Classification Search
CPC ......... G06F 17/30501; G06F 17/30498; G05B 19/41855; G05B 2219/31368
See application file for complete search history.

(56) References Cited

U.S. PATENT DOCUMENTS 5,991,713 A * 11/1999 Unger ................. H03M 7/3084
704/1
6,625,464 B1 * 9/2003 Bandy .................... H04H 20/30
340/7.26

(Continued)

FOREIGN PATENT DOCUMENTS

CN 101681288 A 3/2010
CN 102196382 A 9/2011
(Continued)

OTHER PUBLICATIONS

HP; "From big-data to knowledge: value chain for CSPs"; URL: http://vertica.com/wp-content/uploads/2013/02/From-Big-Data-to-Kowlede-Value-Chain-for-CSPs-4AA4-3407ENW1.pdf; XP002729180; 2013.
(Continued)

*Primary Examiner* — Hosain T Alam
*Assistant Examiner* — Anthony G Gemignani
(74) *Attorney, Agent, or Firm* — Henry M. Feiereisen LLC

(57) ABSTRACT

A method for automatically processing log files of different types of an automation system, said method determining a message part of a data set of the log file. All contents of the respective data sets of the log files are concatenated. The data sets of all the log files are summarized in a summary (Continued)

file. The data sets of all the log files are chronologically sorted in the summary file. The data sets are compressed in the summary file. The compressed data sets in the summary file are coded. The compressed data sets are assigned to groups with associated group codes. The group code of the assigned group is decoded. The decoded group code is output as the alphanumeric message part of the log file. The alphanumeric message part of the log file is stored in a memory.

17 Claims, 2 Drawing Sheets

(51) Int. Cl.
*G06F 16/23* (2019.01)
*F02C 9/28* (2006.01)
*G05B 19/418* (2006.01)

(52) U.S. Cl.
CPC ...... *G06F 16/1734* (2019.01); *G06F 16/2358* (2019.01); *G05B 2219/31151* (2013.01); *G05B 2219/31368* (2013.01)

(56) References Cited

U.S. PATENT DOCUMENTS

| | | | |
|---|---|---|---|
| 2003/0167406 A1* | 9/2003 | Beavers | G06F 11/0709 726/22 |
| 2005/0031053 A1 | 2/2005 | Claussen et al. | |
| 2006/0218206 A1* | 9/2006 | Bourbonnais | G06F 17/30377 |
| 2008/0294384 A1 | 11/2008 | Lushin et al. | |
| 2010/0094591 A1* | 4/2010 | Brown | G06F 19/00 702/181 |
| 2011/0191373 A1* | 8/2011 | Botros | G06F 17/30991 707/776 |
| 2013/0159209 A1* | 6/2013 | Zhao | G06Q 30/02 705/348 |
| 2013/0332877 A1* | 12/2013 | Florance | G06Q 10/10 715/781 |
| 2014/0013334 A1* | 1/2014 | Bisdikian | G06F 11/0709 719/313 |
| 2014/0101456 A1* | 4/2014 | Meunier | G06F 17/2247 713/189 |
| 2014/0298341 A1* | 10/2014 | Duftler | G06F 9/46 718/100 |
| 2014/0317040 A1* | 10/2014 | Liu | G06K 9/6296 706/46 |

FOREIGN PATENT DOCUMENTS

| | | |
|---|---|---|
| CN | 103514398 A | 1/2014 |
| WO | WO 2000/39674 A1 | 7/2000 |
| WO | WO 2006/112999 A1 | 10/2006 |

OTHER PUBLICATIONS

Zhao H. et al; "Entity identification for heterogeneous database integration—a multiple classifier system approach and empirical evaluation"; Information Systems, Pergamon Press, Oxford; vol. 30; No. 2; pp. 119-132; ISSN: 0306-4379; XP027844352; 2005.

* cited by examiner

METHOD FOR AUTOMATICALLY PROCESSING A NUMBER OF LOG FILES OF AN AUTOMATION SYSTEM

CROSS-REFERENCES TO RELATED APPLICATIONS

This application is the U.S. National Stage of International Application No. PCT/EP2015/056227, filed Mar. 24, 2015, which designated the United States and has been published as International Publication No. WO 2015/150163 and which claims the priority of European Patent Application, Serial No. 14163510.2, filed Apr. 4, 2014, pursuant to 35 U.S.C. 119(a)-(d).

BACKGROUND OF THE INVENTION

The invention relates to a method for automatically processing a plurality of log files of an automation system of a technical facility, such as a power plant.

Large technical facilities, such as steam-turbine and gas-turbine power plants, chemical plants, steel works and rolling mills are complex technical systems having a plurality of components (e.g. several hundred), such as sensors, actuators, drives etc., each of which may possibly acquire and provide a number of measured values per second for further processing and transmission.

To monitor and control components, such as turbines, evaporators, generators, sensors, drives and actuators of the technical facility, the data obtained from the components is processed, analyzed and interpreted. In this way it is possible to recognize deviations from a predetermined normal state as early as possible and if necessary prevent damage to or failure of the components, such as the turbine.

The quantity of data/measurement signals to be interpreted here and the complexity of possible dependencies between the data/measurement signals is usually far too great for an effective analysis of the data/measurement signals to be possible by one operator.

In such cases, for control and monitoring of the facility, the technical facility comprises an automation system that is generally subdivided into an operator control and monitoring level, an automation/process level and a field level, which are connected to one another via a communication unit, especially via one or more data bus systems.

The data, such as measurement signals, status signals of individual components such as sensors, actuators, drives, turbines, automation units etc., is usually collected together into log files that describe one or more events of one or more components and/or component groups that have occurred, and is transmitted to relevant components of the technical facility.

In practical automatic control and/or monitoring there is the problem of the increasing number of generated log files on occurrence of an event in the technical facility, for example on occurrence of a fault. Typical causes of this are e.g. defective sensors and/or defective parts of the facility, which deliver additional measured values and thus additional log files. This makes it difficult for the operating personnel to have an overview of and to record the generated log files. In addition it is difficult for the operating personnel correctly to assess the event that has occurred.

Over and above this a plurality of different types of log file are generated, of which the contents are not compatible and not comparable.

SUMMARY OF THE INVENTION

The object of the invention is based on providing a simple method for automatically processing a plurality of log files of an automation system of a technical facility.

This object is achieved in accordance with the features of the independent claims. Preferred forms of embodiment are especially able to be taken from the dependent claims.

The inventive method for automatic processing, especially pre-processing, of a number of generated, especially heterogeneous and/or incompatible, log files of an automation system of a technical facility comprises at least the following steps:

Determining at least one message part of each data set of a log file by:
Concatenating all contents of the respective data set of the log file,
Summarizing the data sets of all log files in a summary file,
Chronological sorting of the data sets of all log files in the summary file,
Compressing each data set in the summary file,
Coding the compressed data sets in the summary file by at least one or more numeric codes,
Sorting and/or assigning (especially grouping) of the compressed data sets to at least one group with an associated group code on the basis of the numeric code(s) established, and
Outputting the alphanumeric message part of the log file by decoding the group code of the assigned group and output of the decoded group code.

By means of the inventive method it is made possible for log files of different types, because of the unification of their contents by coding and grouping, to be comparable and compatible with each other. This enables the unified and grouped contents of the log files of different types to be easily and much more quickly further processed, especially used for a further automatic analysis.

One form of embodiment makes provision that, when the data sets are compressed, these are processed such that at least the data length and/or the data content of the respective data set will be reduced.

For example spaces are inserted automatically for each special character or non-numeric or non-alphabetic character contained in a data set, wherein for two or more consecutive spaces resulting therefrom, a number of consecutive spaces exceeding a single space is removed from the data set. Through this those characters in the message part (for example text part, notification part, status part) of the log file that do not describe the event in greater detail, for example "*", "+", "§", "#" etc., are removed from this message part and thus the message part is extracted from the system part (for example system time, version, revision) of the log file. Thus the analysis of the log file is restricted to the content-relevant message part and is thus greatly simplified and accelerated.

Furthermore the concatenation of the contents of the respective data set is resolved, so that the contents are separated again. In particular the contents are divided into words in this case. The separated alphanumeric contents resulting from the resolution of the concatenation, especially words with fewer than four characters, are removed for reducing the characters/data to be further processed and thus for data compression. Words with fewer than four characters are able to be ignored for analysis, since these only represent "statistical noise" for subsequent similarity calculations and are thus not relevant.

One possible form of embodiment of the coding makes provision for the data sets, especially their separate alphanumeric contents, to be analyzed and unified such that each separate alphanumeric content is assigned a reference word and each reference word is assigned a numeric code. As an alternative to the numeric code an alphabetic code and/or an alphanumeric code can be used. The numeric code has the advantage of a simple and fast sorting and grouping of the data sets of the log files.

For further unification and compression of the data sets from different log files and simple and fast analysis of these data sets the summary file with the separate alphanumeric contents of all log files is converted on the basis of the reference words establishment and/or the numeric code(s) into a two-dimensional, especially alphanumeric, code matrix.

In an especially simple form of embodiment the numeric codes of the two-dimensional code matrix are sorted chronologically and/or on the basis of the respective character length. In this case similar numeric codes of the code matrix can be grouped by means of a similarity operation, especially the so-called Levenshtein distance, especially assigned to at least one group. In this case each group is described or represented by an associated group code.

Thus, for an established Levenshtein distance of zero for a new numeric code to be considered to one of the groups of this numeric code to be considered, said code can be assigned to a group since the numeric code to be considered is identical to the group, especially to the group code representing this group.

On the other hand, for a Levenshtein distance of one for a numeric code to be considered to one of the groups and for a difference at only one point of the numeric code to be considered from this one group of this numeric code to be considered, this numeric code to be considered will be assigned to this one group.

Over and above this each new numeric code to be considered can be compared to non-grouped numeric codes of the same length or with a greater length of maximum one character.

In the event of the Levenshtein distance of a new numeric code to be considered to another non-grouped numeric code being equal to one, a new group with a new group code is formed from the two numeric codes such that if the two numeric codes to be considered are of different lengths, the new group will be assigned the shorter numeric code as the new group code or if the two numeric codes with at least one character different of the new group are the same length, the numeric code without the different character is assigned as the new group code.

As an alternative or in addition, when a new numeric code to be considered that does not have a Levenshtein distance of equal to one to another non-grouped numeric code is identified, this numeric code to be considered can be assigned to a further new group. In this case this further new group is assigned this new numeric code to be considered as the new group code. Future new numeric codes to be considered, which on comparison with this new group code have a Levenshtein distance of one, are assigned to this new group.

Thus the two-dimensional code matrix established and the groups with group codes established for grouping of similar and/or identical numeric codes that describe an event can be expanded or supplemented continuously in the manner of an expert system by adding new numeric codes of new data sets of further/new log files.

Over and above this the method allows only a predetermined number of groups to be used when the method is started and no new groups to be generated. Through this a robust grouping of new numeric codes to be considered is initially made possible. The generation of new groups can then be allowed in ongoing operation.

The described method is characterized in that the originally non-compatible and non-comparable message parts of the different types of log file, by concatenating all components in the original state and subsequent compression of these by character reduction and coding of this reduced character string as well as grouping of a similar and/or identically coded character string, sorts and analyzes much faster compared to conventional analysis methods.

Preferably the method is used in an automation system of a technical facility, such as a power plant.

In a simple form of embodiment the inventive method is implemented in a component of an automation system of a technical facility, wherein the automation system comprises at least one operation and monitoring level, an automation/process level and a field level, which are connected to one another via a communication system.

BRIEF DESCRIPTION OF THE DRAWING

The characteristics, features and advantages of this invention described above and also the manner in which these are achieved will become clearer and more easy to understand in conjunction with the following description of exemplary embodiments, which will be explained in greater detail in conjunction with the drawings, in which.

DETAILED DESCRIPTION OF PREFERRED EMBODIMENTS

Figure 1:
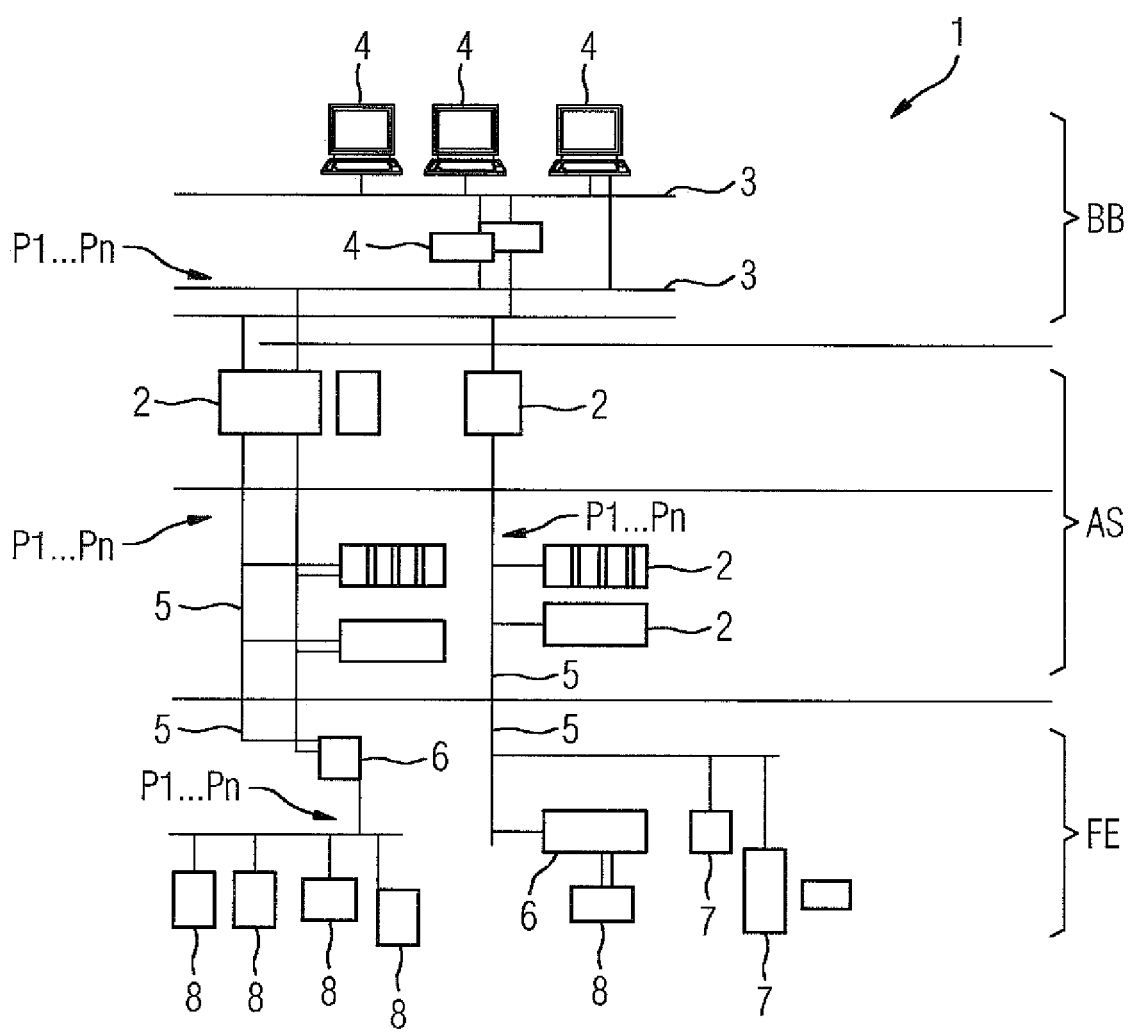
FIG. 1 shows a schematic of an exemplary embodiment for an automation system for control and monitoring of a technical facility.

Parts that correspond to one another are provided with the same reference characters in all figures.

FIG. 1 shows a schematic block diagram of an exemplary embodiment for an automation system 1 of a technical facility, such as a power plant or a chemical plant.

The automation system 1, in a process level AS (also called the automation level), comprises a number of automation devices 2, which are connected to one another and communicate with one another and with a control unit 4 in an operation and monitoring level BB. In addition the automation devices 2 are connected via a field bus 5 to field devices 6 at a field level FE and communicate with one another, The data bus 3 can be an Ethernet bus or another suitable data transmission unit for example. The field bus 5 can be an Ethernet-based field bus 5 for example or can be embodied wired or wirelessly as another suitable data transmission unit. The data bus 3 and/or the field bus 5 can form a computer network in this case.

The automation devices 2 can be constructed both as freely-programmable and also as stored-program processors, especially as a processor unit, and in each case control, regulate and/or monitor a number of component groups 7 or subsystems of the individual parts of the technical facility. In particular the control, regulation and/or monitoring of the technical facility also includes an analysis and other processing of the data, such as measurement signals, control signals, input and output signals, intermediate signals, stored data, processing data.

The control units 4 can be data processing units, such as a personal computer or another suitable operation and monitoring unit, by means of which the technical facility is monitored and controlled.

The field devices 6 can for example be compact, freely-programmable or stored-program controls, especially a processor unit and/or at least one partly hard-wired or logical circuit arrangement, which control, regulate and/or monitor individual components 8 of parts of plants, such as measurement probes (sensors) and/or setting elements (actuators) and which are connected for the purposes of communication by means of the field bus 5 to the automation device 2 (also called control device).

During operation of a technical facility, such as a power plant, large volumes of data in the form of log files P1 to Pn, which comprise control commands, status messages and/or fault messages, which are triggered by control interventions in the control unit 4 or are displayed on screens or on other display units of the control unit 4, are moved via the data bus 3 and the field bus 5. In such cases, in particular during commissioning and during startup/shutdown of the facility, a plurality of control interventions are required that result in a correspondingly large number of responses to be considered. This leads to a not inconsiderable load on the operating personnel.

Figure 2:
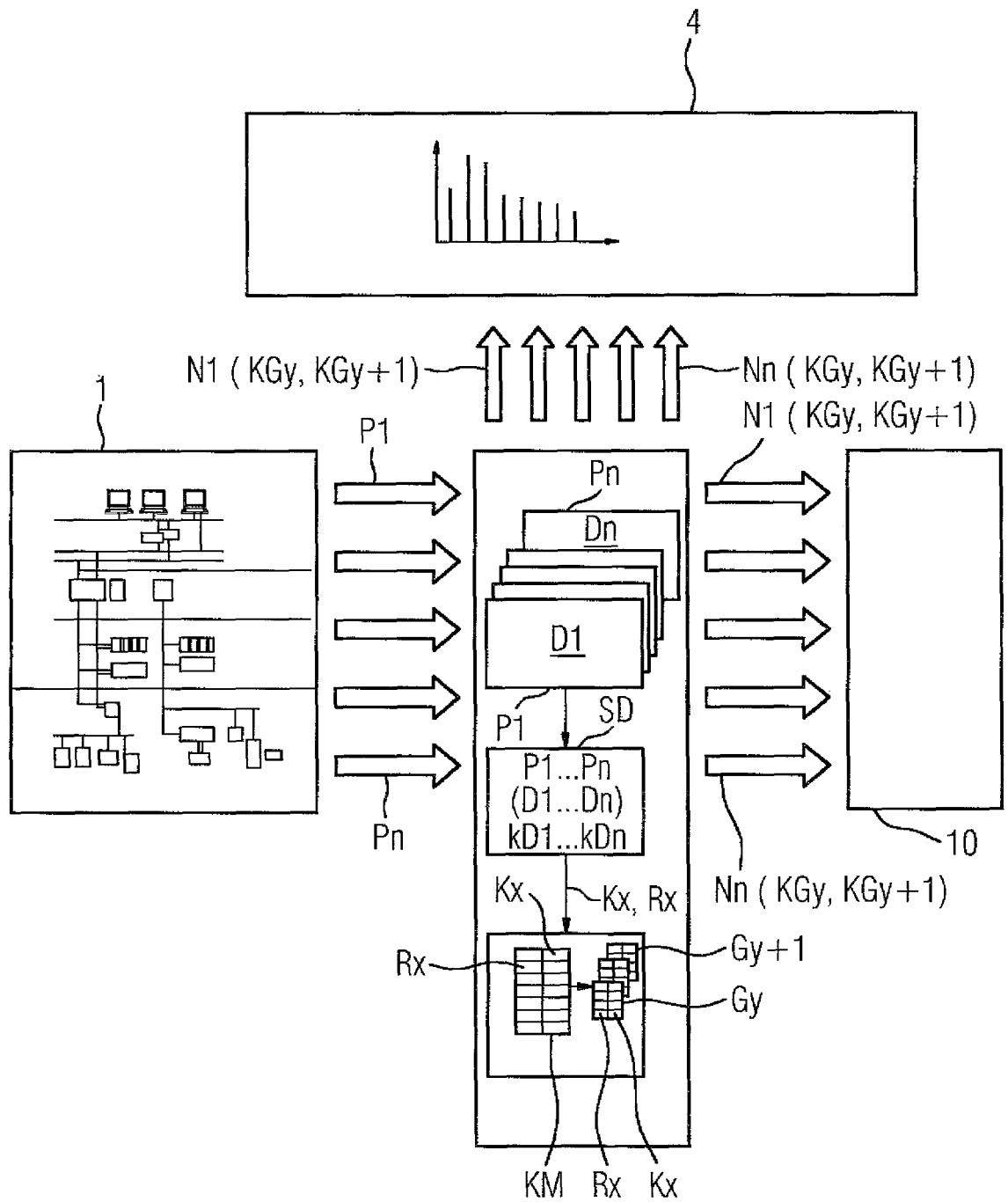
FIG. 2 shows a schematic of an exemplary embodiment for a method for processing log files that are generated in the automation system.

FIG. 2 shows a schematic of an exemplary embodiment for a method for processing, especially pre-processing, of log files P1 to Pn, which are generated in the automation system 1 and are transmitted via the data bus 3 and/or the field bus 5 and are exchanged between the units of the automation system, especially between the control units 4, the automation devices 2 and the field devices 6.

The log files P1 to Pn each comprise at least one acquisition time stamp and a text, especially a message, a notification, a status text, which describe at least one event. In addition the log files P1 to Pn can include as text a system time, a version/revision number and further information. In such cases for example a number of log files P1 to Pn can describe one event or a number of events. Various *log, *xml, *txt, *info and/or *dmp files are created and generated as log files P1 to Pn in an automation system 1 of a technical facility for example.

In at least one of the components of the automation system 1 a computer program product in particular is implemented, which is able to be loaded directly into a memory of a digital computer, such as a control unit 4, comprising program code sections that are suitable for executing steps of the method described below. As an alternative the computer program product can also be loaded into an automation unit 2.

As an alternative a computer-readable storage medium, e.g. any given memory, can be provided, which comprises instructions (e.g. in the form of program code) able to be executed by a control unit 4, which are suitable for the control unit 4 to carry out steps of the method described below.

The method implemented as a log file compressor 9 for automatic processing, especially pre-processing, of the plurality of generated, especially heterogeneous or incompatible log files P1 to Pn, comprises at least the following steps:

Determining at least one message part N1 to Nn of each data set D1 to Dn of a log file P1 to Pn by:
Concatenating all the contents of the respective data set D1 to Dn of the log file P1 to Pn,
Summarizing the data sets D1 to Dn of all log files P1 to Pn in a summary file SD,
Chronological sorting of the data sets D1 to Dn of all log files P1 to Pn in the summary file SD,
Compressing each data set D1 to Dn in the summary file SD,
Coding the compressed data sets kD1 to kDn in the summary file SD by at least one or more numeric code(s) Kx,
Sorting and/or assigning (especially grouping) of the compressed data sets kD1 to kDn, on the basis of the established numeric code(s) Kx, to at least one group Gy that has at least one associated group code KGy, and
Outputting the alphanumeric message part N1 to Nn of the log file P1 to Pn by decoding the group code KGy of the assigned group Gy and output of the decoded group code KGy.

The message part N1 to Nn of each data set D1 to Dn of the log files P1 to Pn comprises text messages, such as notifications, statuses, texts, information, warnings etc. for example. The respective data set D1 to Dn can take the form of a table or a database or another suitable form with field divisions for example.

The message part N1 to Nn of the respective log file P1 to Pn can be contained for example in one or more fields of the associated data set D1 to Dn. Further fields of the data set D1 to Dn contain log and/or system information, such as for example system time, version number, revision number etc.

The inventive method makes provision for the contents of the fields of the respective data set D1 to Dn of each log file P1 to Pn to be concatenated in a first step and subsequently for all concatenated data sets D1 to Dn of all log files P1 to Pn to be summarized in a summary file SD, especially an individual table or database. For example two log files P1 and P2 comprise the following contents or entries:

Log File P1:

| | |
|---|---|
| 28.03.2014 | ABC |
| 21.03.2014 | ZDF |

Log File P2:

| | |
|---|---|
| 27.03.2014 | XYZ |
| 01.01.2014 | SAP |

After concatenation and summarizing of the contents in the summary file SD, said file summarizes the contents as follows:

| | |
|---|---|
| 28.03.2014 | ABC |
| 27.03.2014 | XYZ |
| 21.03.2014 | ZDF |
| 01.01.2014 | SAP |

Within this especially tabular summary file SD the data sets D1 to Dn with the concatenated contents are sorted on the basis of a respective time stamp in each case, especially chronologically sorted, for example sorted in ascending or descending order.

The associated time stamp can especially involve an acquisition time stamp for the underlying message, which especially describes an event, such as "ambient temperature in permitted range", "initial start activated", "pump failed", "turbine started" etc. in the technical facility. As an alternative or in addition the data sets D1 to Dn can be sorted on the basis of alternate or additional log parameters, such as location of acquisition, type of acquisition and/or acquisition period.

On subsequent compression of the data sets D1 to Dn with the concatenated contents these are processed such that at least the data length and/or the data contents of the respective data set D1 to Dn is/are reduced.

For example spaces are inserted automatically for special characters, such as for example "§ ", "#", "@", etc., or non-numeric or non-alphabetic characters, "-", "/", etc. contained in a data set D1 to Dn. Subsequently, in the contents string of the respective data set D1 to Dn, for two or more consecutive spaces, these are automatically reduced to one space by deletion/removal of the number of consecutive spaces extending beyond one individual space. Through this each character that does not describe the event in greater detail is removed from the data set D1 to Dn, especially from the message part N1 to Nn (for example text part, notification part, status part) of the log file P1 to Pn. Thus the message part N1 to Nn is extracted in a simple manner from the system part (for example system time, version, revision) of the log file P1 to Pn, so that the further processing and analysis of the log file is restricted to the content-relevant message part N1 to Nn and is thus greatly simplified and accelerated.

In a further step the concatenation of the contents of the message part N1 to Nn is then resolved, through which the contents, especially words/phrases, are separated. In such cases the contents are then separated into words/phrases for example.

For further data compression of the data sets D1 to Dn, each of the separated words/phrases having fewer than four, especially fewer than three, characters is removed from the data set D1 to Dn for example. For example the word "is" or "yes" is deleted. This makes it possible, easily and effectively, to compare two or more different entries/contents with one another syntactically (without semantic meaning) and automatically.

There is also provision for the data sets D1 to Dn, especially their separate alphanumeric contents, such as the separated words/phrases with especially more than three characters, to be analyzed and unified such that each separate alphanumeric content is assigned a reference word Rx and each reference word Rx is assigned a numeric code Kx. Through this the memory requirement for archiving the data sets D1 to Dn is greatly reduced and their analysis is greatly accelerated.

For example the words and/or phrases of the message contents

"ambient-temperature in permitted range",

"turbine-temperature in green range",

"first-start activated",

"pump failed",

"turbine started", are converted into the following reference words Rx

"ambient-temperature is permitted",

"turbine-temperature is permitted",

"first-start activated",

"pump failure",

"turbine start", and/or are converted into the following numeric code Kx:

"1<u>23</u>",

"4<u>23</u>",

"56",

"7",

"8",

In this case individual words are encoded by means of a single-digit numeric code Kx for example. Phrases with more than one word are encoded by means of a numeric code Kx having a number of digits corresponding to the number of words for example. Identical words and/or phrases are encoded with the same reference word Rx and with the same numeric code Kx. Words and/or phrases of different data sets D1 to Dn with partly matching characters and/or words are encoded with a numeric code Kx matching at least at these digits.

As an alternative to a numeric code KX an alphabetic code and/or an alphanumeric code can be used. The coding of the data sets D1 to Dn by means of the numeric code Kx has the advantage of a simple and fast sorting and grouping of the data sets D1 to Dn of the log files P1 to Pn.

For further unification and compression of the data sets D1 to Dn of the various log files P1 to Pn and simple and fast analysis of these data sets D1 to Dn, the tabular summary file SD with the separate alphanumeric contents of all log files P1 to Pn is converted on the basis of the established reference words RX and/or of the numeric code Kx into a two-dimensional, especially alphanumeric, code matrix KM.

In the two-dimensional code matrix KM the numeric codes Kx are then sorted chronologically, especially in ascending order of time and/or as a function of the respective character length. For example the numeric codes Kx "5632", "543", "64221", "123" are sorted as follows:

"123", "543", '5632", "64221".

In addition, in a further step, similar numeric codes Kx of the code matrix KM can be grouped by means of a similarity operation, especially the so-called Levenshtein distance, especially assigned to at least one group Gy (cluster).

In this case each group Gy is described or represented by an associated group code KGy. The associated group code KGy in this case can be generated from at least the numeric code Kx of a first data set D1 to Dn that will be assigned to this group Gy. As an alternative the respective group code KGy of one or more groups Gy can be predetermined.

For example, for a Levenshtein distance to a group Gy established as zero for a new numeric code Kx to be considered, this numeric code Kx to be considered can be assigned to this group Gy, especially with the group code KGy representing this group Gy.

On the other hand, for a Levenshtein distance of one to a group Gy for a numeric code Kx to be considered and with a difference of the numeric code Kx to be considered at only one digit from this one group Gy, this numeric code Kx to be considered is assigned to this one group Gy. For example for a group Gy with an associated group code KGy of "12", this group will be assigned the numeric codes Kx with the following digits "123", "124", "12" and/or "13".

In order for example to improve and to accelerate search functions in a subsequent analysis and also in the grouping of the numeric codes Kx, the comparison of the new numeric code Kx to be considered with the already generated groups Gy will be started at the last group Gy set up or at the group Gy that has last been assigned a preceding numeric code Kx.

Especially the start for the grouping or assignment of a new numeric code Kx to be considered for the group Gy, which has been assigned a preceding numeric code Kx, accelerates the grouping algorithm, since usually neighboring numeric codes Kx, especially following on from each other but also preceding each other in time, which have previously been sorted chronologically, are assigned to one and the same event and thus are able to be assigned to one and the same group Gy.

Over and above this each newly generated and thus new numeric code to be considered can be compared with non-grouped numeric codes Kx of the same length or with a greater length of maximum one character.

In the event of the Levenshtein distance to another non-grouped numeric code Kx of a new numeric code Kx to be considered being equal to one, a new group Gy+1 with a new group code KGy+1 is formed from the two numeric codes Kx such that If the two numeric codes Kx to be considered are of a different length, the new group Gy+1 is assigned the shorter numeric code Kx as the new group code KGy+1 (for example Kx="123" and "12" leads to a new group Gy with a new group code KGy+1 of "12") or If the two numeric codes Kx are the same length with at least one different digit, the new group Gy+1 will be assigned the numeric code Kx without the different digit as the new group code KGy+1 (for example Kx="133" and "134" leads to a new group Gy with a new group code KGy+1 of "13").

In addition or as an alternative, when a new numeric code Kx to be considered that does not have a Levenshtein distance that is equal to one to another non-grouped numeric code Kx is identified, this numeric code Kx to be considered will be assigned to a further new group Gy+1. In this case this further new group Gy+1 will be assigned this new numeric code Kx to be considered as group code KGy+1. Future new numeric codes Kx to be considered, which, when compared to this new group code KGy+1, have a Levenshtein distance of one, will be assigned to this new group Gy+1.

The two-dimensional code matrix KM thus represents a dynamic expert system in which the established groups Gy, Gy+1 with group codes KGy, KGy+1 for grouping similar and/or identical codes Kx that describe an event, can be expanded or supplemented in an ongoing manner by addition of new numeric codes Kx of new data sets D1 to Dn of further/new log files P1 to Pn.

For further processing of the content of the numeric code Kx and/or group codes KGy, KGy+1, these are decoded and output as alphanumeric message part N1 to Nn of the log file P1 to Pn and can be stored for example in a memory 10.

As an alternative or in addition these numeric codes Kx and group codes KGy, KGy+1 decoded and representing the alphanumeric message part N1 to Nn can be supplied to the control unit 4 for further analysis and assessment of the event(s).

Over and above this the method allows only a predetermined number of groups Gy to be used when the method is started and no new groups Gy+1 to be generated. Through this a robust grouping of new numeric codes Kx to be considered is initially made possible. The generation of new groups Gy+1 can then be allowed in ongoing operation.

Although the invention has been illustrated and described in greater detail by preferred exemplary embodiments, the invention is not restricted by the disclosed examples and other variations can be derived herefrom by the person skilled in the art, without departing from the scope of protection of the invention. In particular the log file compressor 9 can be implemented at a suitable location in a component of the automation system 1.

The invention claimed is:

1. A method for automatically processing log files of different types of an automation system of a technical facility, said method comprising:
generating during operation of a technical facility, by one or more components of the automation system, a plurality of different types of log files, the log files describing one or more events of one or more components and/or component groups that have occurred;
concatenating one or more data sets of each of the plurality of log files;
summarizing the concatenated data sets of all the plurality of log files in a summary file;
sorting the data sets of the plurality of log files in the summary file;
compressing the data sets in the summary file;
coding the compressed data sets in the summary file by a numeric, alphabetic or alphanumeric code;
sorting and assigning, by way of a similarity operation, the compressed data sets established on the basis of the numeric, alphabetic or alphanumeric code to groups with associated group codes, wherein the groups with group codes are established for grouping of similar and/or identical numeric codes that describe an event;
decoding the group code of the assigned one of the groups;
outputting an alphanumeric message part of the one or more data sets of a group and the decoded group code; and
storing the alphanumeric message part and the decoded group in a memory.

2. The method of claim 1, wherein during compression of the data set, the data set is processed such that a data length and/or a data content of the data set is reduced.

3. The method of claim 2, further comprising automatically inserting spaces for special characters contained in the data set and for at least two or more consecutive spaces resulting therefrom, removing consecutive spaces extending beyond a single space from the data set.

4. The method of claim 1, further comprising resolving the concatenation of the contents of the data set and removing resultant separate alphanumeric contents with fewer than four characters.

5. The method of claim 4, further comprising analyzing and unifying the resultant separate alphanumeric contents, assigning a reference word to each of the separate alphanumeric content and assigning a numeric code to each reference word.

6. The method of claim 5, further comprising converting the summary file with the separate alphanumeric contents established on the basis of the reference word and/or the numeric code into a two-dimensional alphanumeric code matrix.

7. The method of claim 6, wherein the numeric codes of the two-dimensional alphanumeric code matrix are sorted chronologically and/or as a function of character length.

8. The method of claim 6, wherein similar ones of the numeric codes of the two-dimensional alphanumeric code matrix are grouped by using a similarity operation.

9. The method of claim 8, wherein the similarity operation is a Levenshtein distance.

10. The method of claim 9, wherein when the numeric code being considered has a Levenshtein distance of zero to one of the groups, said numeric code being considered is assigned to said one of the groups.

11. The method of claim 9, wherein when the numeric code being considered has a Levenshtein distance of one to one of the groups, and when the numeric code being considered differs by only one digit from the one of the groups, said numeric code being considered is assigned to said one of the groups.

12. The method of claim 9, wherein a new numeric code being considered is compared to non-grouped numeric codes of a same length or to non-grouped numeric codes having a greater length of a maximum of one character.

13. The method of claim 12, wherein when the numeric code being considered has a Levenshtein distance of one to another non-grouped numeric code, a new group is formed from the numeric code being considered and the non-grouped numeric code such that
when the numeric code being considered and the non-grouped numeric code are of different lengths, the new group is assigned a shorter numeric code, and
when the numeric code being considered and the non-grouped numeric code are of same length with at least one different digit, the new group is assigned the numeric code without the different digit.

14. The method of claim 9, wherein when the numeric code being considered is determined to have no Levenshtein distance to any other non-grouped numeric code that are less than two, the numeric code being considered is assigned to a new group.

15. A technical facility, comprising an automation system including log files of different types, said automation system configured to:
generate during operation of a technical facility, by one or more components of the automation system, a plurality of different types of log files, the log files describing one or more events of one or more components and/or component groups that have occurred;
concatenate one or more data sets of each of the plurality of log files;
summarize the concatenated data sets of the plurality of log files in a summary file;
sort the data sets of the plurality of log files in the summary file;
compress the data sets in the summary file;
code the compressed data sets in the summary file by a numeric, alphabetic or alphanumeric code;
sort and assign, by way of similarity operation, the compressed data sets established on the basis of the numeric, alphabetic or alphanumeric code to groups with associated group codes, wherein the groups with group codes are established for grouping of similar and/or identical numeric codes that describe an event;
decode the group code of the assigned one of the groups;
output an alphanumeric message part of the one or more data sets of a group and the decoded group code; and
store the alphanumeric message part and the decoded group code in a memory.

16. An automation system of a technical facility, comprising:
an operation and monitoring level;
an automation level;
a field level; and
a communication system configured to connect the operation and monitoring level, the automation level and the field level to one another,
at least one of the operation and monitoring level, the automation level and the field level being configured to:
generate during operation of a technical facility, by one or more components of the automation system, a plurality of different types of log files, the log files describing one or more events of one or more components and/or component groups that have occurred;
concatenate one or more data sets of each of the plurality of log files;
summarize the concatenated data sets of the plurality of log files in a summary file;
sort the data sets of the plurality of log files in the summary file;
compress the data sets in the summary file;
code the compressed data sets in the summary file by a numeric, alphabetic or alphanumeric code;
sort and assign, by way of similarity operation, the compressed data sets established on the basis of the numeric, alphabetic or alphanumeric code to groups with associated group codes, wherein the groups with group codes are established for grouping of similar and/or identical numeric codes that describe an event;
decode the group code of the assigned one of the groups;
output an alphanumeric message part of the one or more data sets of a group and the decoded group code; and
store the alphanumeric message part and the decoded group code in a memory.

17. A method for automatically processing log files of different types of an automation system of a technical facility, wherein the automation system comprises at one operation and monitoring level, an automation/process level and a field level, which are connected to one another via a communication system, said method comprising:
generating during operation of a technical facility, one or more components of the automation system, a plurality of different types of loci files, the log files describing one or more events of one or more components and/or component groups that have occurred;
concatenating one or more data sets of each of the plurality of log files;
summarizing the concatenated data sets of the plurality of log files in a summary file;
sorting the data sets of the plurality of log files in the summery file;
compressing the data sets in the summary file;
coding the compressed data sets in the summary file by a numeric, alphabetic or alphanumeric code;
sorting and assigning, by way of a similarity operation, the compressed data sets established on the basis of the numeric, alphabetic or alphanumeric code to groups with associated group codes, wherein the groups with group codes are established for grouping of similar and/or identical numeric codes that describe an event;
decoding the group code of the assigned one of the groups;
outputting an alphanumeric message part of the one or more data sets of a group and the decoded group code; and
storying the alphanumeric message part and the decoded group in a memory.

* * * * *

UNITED STATES PATENT AND TRADEMARK OFFICE
CERTIFICATE OF CORRECTION

PATENT NO. : 11,068,486 B2  
APPLICATION NO. : 15/301640  
DATED : July 20, 2021  
INVENTOR(S) : Alexander Storl, Steffen Pauer and Mikhail Roshchin Page 1 of 1

It is certified that error appears in the above-identified patent and that said Letters Patent is hereby corrected as shown below:

On the Title Page

Under (30) Foreign Application Priority Data:
Replace "EP14163510" with --EP14163510.2--.

On page 2, under (56) References Cited FOREIGN PATENT DOCUMENTS:
Replace "WO 2000/39674 A1" with --WO 00/39674 A1--.

In the Claims

In Column 12, Line 59, Claim 17:
Replace "storying" with --storing--.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*